(12) United States Patent
Eyeson et al.

(10) Patent No.: US 6,956,940 B2
(45) Date of Patent: Oct. 18, 2005

(54) METHOD AND APPARATUS FOR AUTOMATICALLY DIRECTING CALLS BY AN INVISIBLE AGENT IN A SWITCH

(75) Inventors: Isaac K. Eyeson, Northglenn, CO (US); Joel M. Ezell, Broomfield, CO (US); Norman W. Petty, Columbia Falls, MT (US)

(73) Assignee: Avaya Technology Corp., Basking Ridge, NJ (US)

( * ) Notice: Subject to any disclaimer, the term of this patent is extended or adjusted under 35 U.S.C. 154(b) by 547 days.

(21) Appl. No.: 10/158,077

(22) Filed: May 29, 2002

(65) Prior Publication Data

US 2003/0223568 A1 Dec. 4, 2003

(51) Int. Cl.$^7$ ................................................ H04M 7/00
(52) U.S. Cl. .............. 379/220.01; 379/219; 379/221.08
(58) Field of Search ........................... 379/88.17, 88.18, 379/219, 220.01, 221.08, 221.12, 229, 240

(56) References Cited

U.S. PATENT DOCUMENTS

| | | | |
|---|---|---|---|
| 5,185,742 A | | 2/1993 | Bales et al. |
| 5,502,757 A | | 3/1996 | Bales et al. |
| 5,864,614 A | * | 1/1999 | Farris et al. ........... 379/221.09 |
| 6,771,762 B1 | * | 8/2004 | Chang et al. .......... 379/221.08 |
| 6,816,579 B2 | * | 11/2004 | Donovan et al. ........ 379/88.17 |

OTHER PUBLICATIONS

U.S. Appl. No. 10/158,097, filed Aug. 29, 2002, I.K. Eyeson et al.

* cited by examiner

Primary Examiner—Bing Q. Bui
(74) Attorney, Agent, or Firm—John C. Moran

(57) ABSTRACT

Utilizing an invisible agent within a remote switch to allow the redirection of calls received from a telephone set connected to a public telephone network to a main switching system.

16 Claims, 3 Drawing Sheets

US 6,956,940 B2

METHOD AND APPARATUS FOR AUTOMATICALLY DIRECTING CALLS BY AN INVISIBLE AGENT IN A SWITCH

TECHNICAL FIELD

This invention relates to telecommunication switching, and in particular, to the redirection of calls from a first switch to a second switching system.

BACKGROUND OF THE INVENTION

It is known in the prior art that as organizations grow geographically through mergers, acquisitions, or other means, it is desirable for a telecommunication system to operate as a single, geographically dispersed switching system with full feature transparency. It is known for a single telecommunication switching system to extend switching and control fabric of a single telecommunication system over a wide area using wide area networks (WAN) such as standard asynchronous transfer mode (ATM). Such a geographically dispersed switching system comprises a main telecommunication switch that provides the overall feature control for the system and remote switches that can be dispersed at great distances from the main telecommunication switch. Such a geographically dispersed system is described in U.S. patent application Ser. No. 09/718,909 filed on Nov. 22, 2000, which is hereby incorporated by reference. Such a geographically dispersed switching system allows individuals utilizing telephone sets directly connected to the remote switch to perform as if their telephone set was directly connected to the main telecommunication switch itself. The problem that arises is that when a user of the remote switch wishes to place a telephone call to a service system of the main telecommunication switch such as a voice mail system (VMS) from a local telephone that interconnects to the remote switch via a public switching office such as a central office. The central office is interconnected to the remote switch via trunks. The user of the local system can access the VMS system by placing a long distance call to the VMS system which incurs long distance charges and the user has to dial additional digits. In addition, if the local user that is utilizing a telephone set connected to the central office wishes to place a telephone call to an extension on the main telecommunication switch or an extension on another remote switch, again the user must place a long distance telephone call. There is no convenient mechanism that allows the local user calling from a telephone set connected to a central office to readily utilize the transmission capabilities of the geographically dispersed telecommunication switching system.

SUMMARY OF THE INVENTION

The foregoing problems are solved and a technical advance is achieved by an apparatus and method that utilize an invisible agent within a remote switch to allow the redirection of calls received from a telephone set connected to a public telephone network to a main switching system.

DETAILED DESCRIPTION

Figure 1:
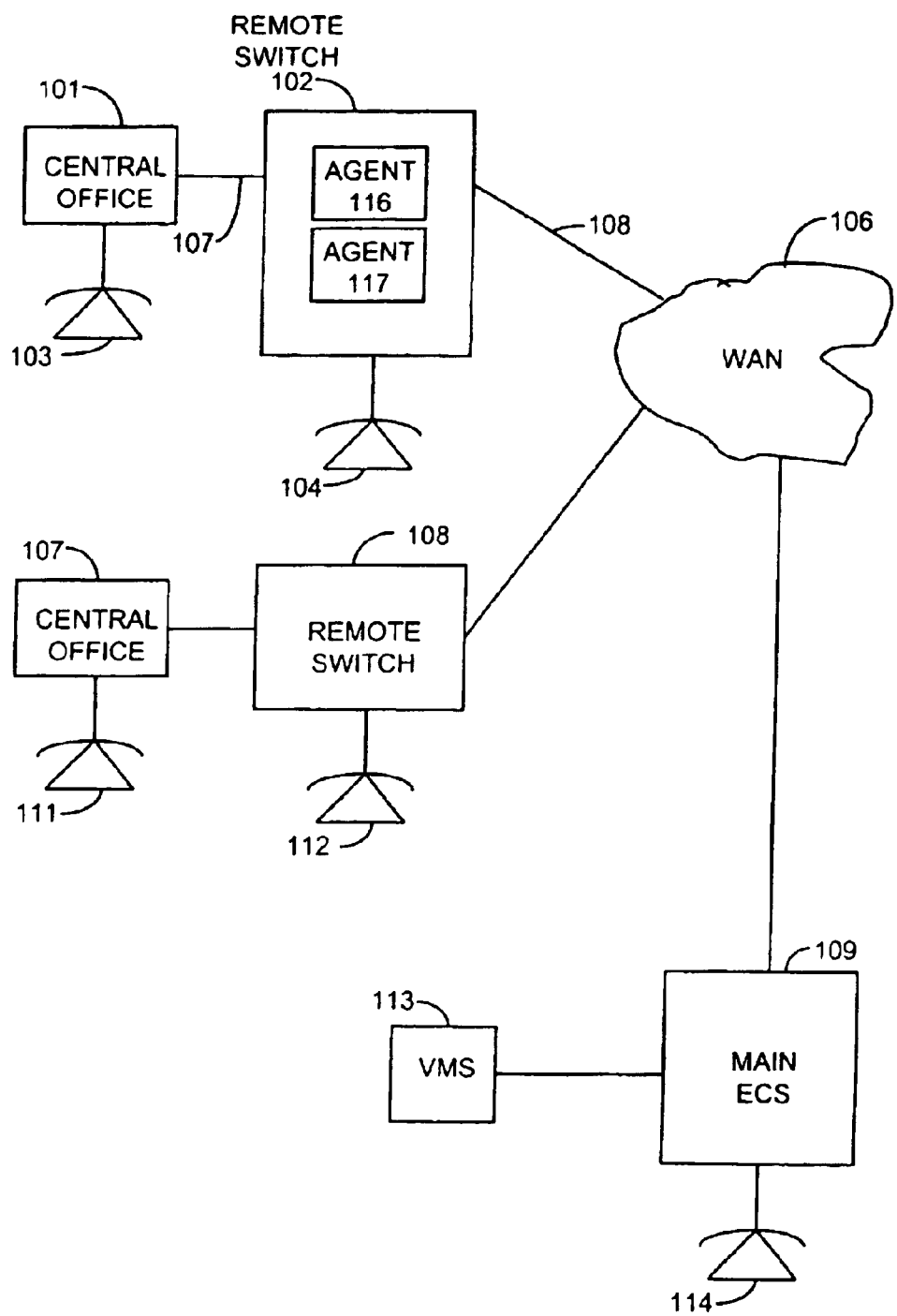
FIG. 1 illustrates an embodiment of the invention.

FIG. 1 illustrates an embodiment of the invention. Remote switch 102 through remote switch 108 and Enterprise communication system 109 (as a main telecommunication switch) along with voice mail system (VMS) 113 form a geographically dispersed telecommunication switching system. For example, Enterprise communication system 109 could be in the United States along with remote switch 108 whereas remote switch 102 is located in the United Kingdom. The significance of this is that the dialing plan of the United States is different than the dialing plan of the United Kingdom. Advantageously, to gain access to VMS 113, a user of telephone 103 places a call to an extension number of agent 116 in remote switch 102 via central office 101 (central switching system) and trunk 107. Remote switch 102 is responsive to the dialing of this extension to terminate the call on agent 116. In response to the call, agent 116 puts telephone set 103 on hold and dials the extension for VMS 113. A call is set up between agent 116 to VMS 113 via WAN 106. After this call has been set up, agent 116 transmits a call transfer message to the controller of remote switch 102 which is responsible to the transfer message to connect telephone set 103 to the call that had been previously set up with VMS 113 by implementing a call transfer feature. Advantageously, the implementation of this operation requires no modification of the software of remote switch 102 or Enterprise communication system 109. When agent 116 placed the call to VMS 113, Enterprise communication system 109 returned dial tone to agent 116 signaling that agent 116 could commence the dialing of the extension for VMS 113.

An embodiment of FIG. 1 allows a user of telephone set 103 to place a call to telephone 114 connected to Enterprise communication system 109 or telephone set 112 interconnected to remote switch 108. In this operation, the user of telephone set 103 places a call to agent 117. Agent 117 is responsive to this call from telephone set 103 to transmit a call origination to Enterprise communication system 109 and to transmit a redirect message to the control software controlling the operation of remote switch 102. The control software is responsive to this redirect message to interconnect the call path from telephone set 103 to the call path that has been set up to Enterprise communication system 109 by controlling the network of remote switch 102. The result is that telephone set 103 is now directly receiving dial tone (call proceed message) from Enterprise communication system 109 and can proceed to dial the extension number for either telephone set 114 or 112. In response to this dialed extension number, Enterprise communication system 109 will establish the call path through remote switch 102, Enterprise communication system 109, or remote switch 108.

Figure 2:
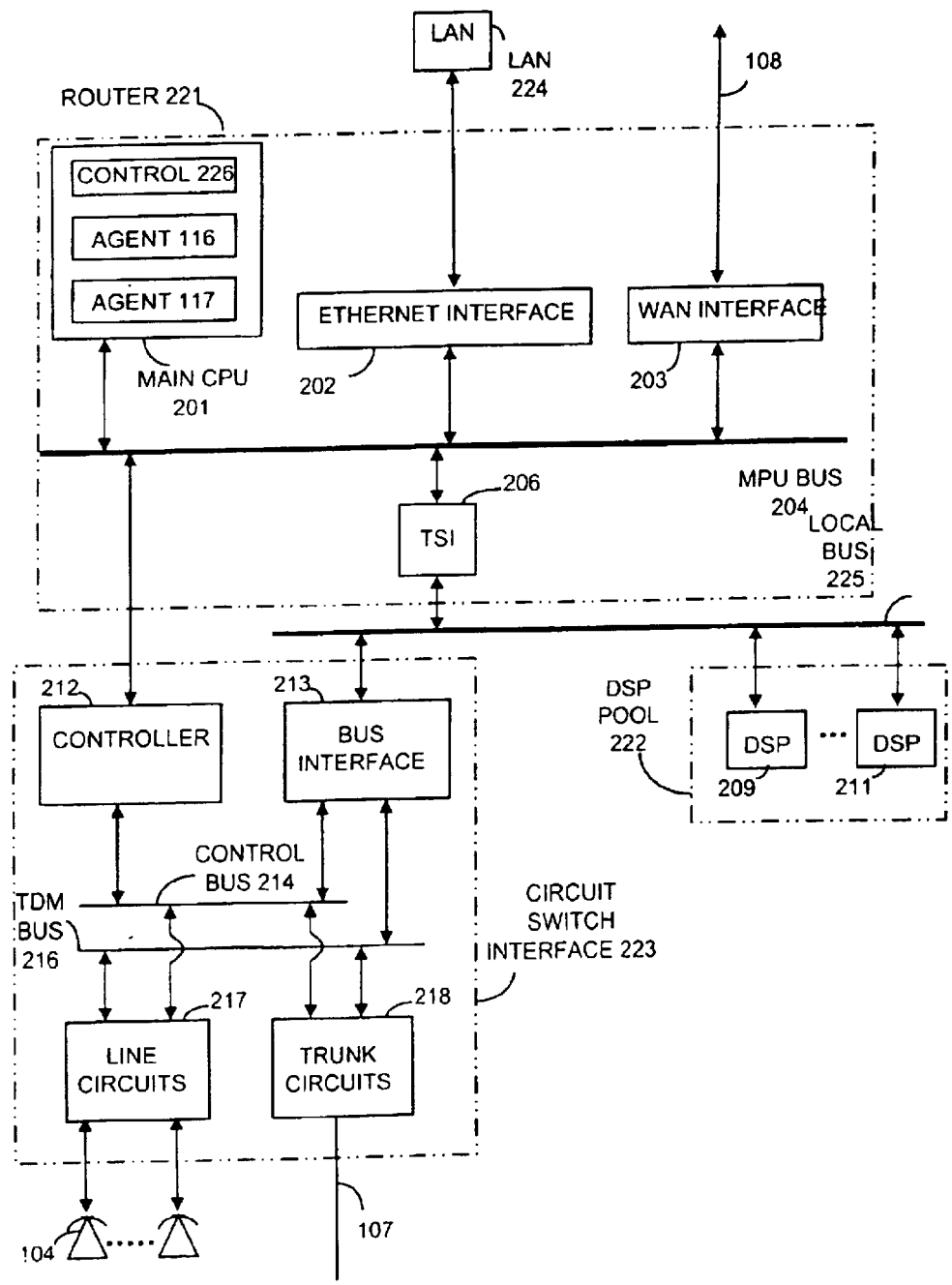
FIG. 2 illustrates an embodiment of a remote switch utilized in the invention.
Figure 3:
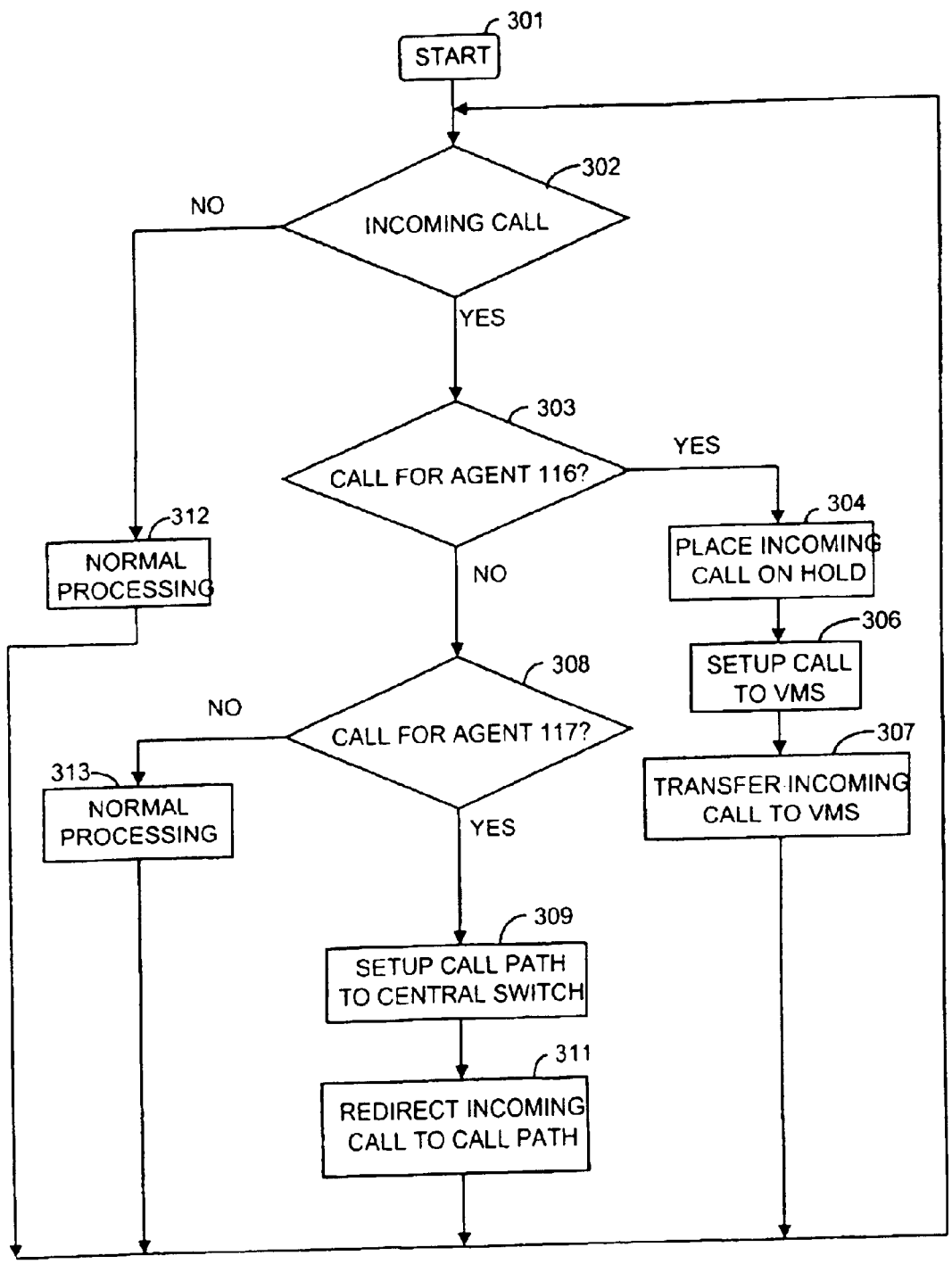
FIG. 3 illustrates, in flow chart form, an embodiment of operations for implementing the invention.

FIG. 2 illustrates in greater detail remote switch 102. DSP pool 222 consists of DSPs 209-211 which are controlled by main CPU 201 via MPU bus 204. Router 221 comprises main CPU 201 that provides overall control of remote switch 102. Main CPU 201 executes control software module 226, agent software module 116, and agent software module 117. Time slot interchange (TSI) 206 provides a mechanism for interexchanging time slots on local bus 225 and MPU bus 204. In addition, TSI 206 can be utilized to interexchange time slots that are being received from telecommunication terminals such as telephone set 104 via line circuits 117 and trunk circuits 218. This provides remote switch 102 with the capability of performing local circuit switching. Ethernet interface 202 interfaces local LAN 224 to bus 204. Local IP telephone sets can be connected to LAN 224. In addition, WAN interface 203 interconnects bus 204 to WAN 106. Bus 204 is the overall informational highway that is used to communicate both control and bearer information within router 221.

DSP pool 222 comprises DSPs 209–211 that are under control of main CPU 201 to perform the necessary coding and conversion tasks.

Circuit switch interface 223 comprises elements 212–218. Controller 212 provides overall control of circuit switch interface 223. Bus interface 213 interfaces control bus 214 and TDM bus 216 with local bus 225. Control bus 214 is utilized to communicate control information between line circuits 217 and trunk circuits 218 and controller 212. TDM bus 216 is utilized to communicate digitally encoded speech or data samples with lines circuits 217 and trunk circuits 218. Line circuits 217 are utilized to provide termination for telecommunication terminals; whereas, trunk circuits 218 terminate trunks with the public telephone switching network 101.

Software module control 226 provides the overall control of remote switch 102 in response to stimuli received from units that are part of remote switch 102 and from control messages received from main Enterprise communication system 109. Consider now the operation previously discussed of connecting a user of telephone set 103 connected to central office 101 to voice mail system 113 via remote switch 102, WAN 106, and Enterprise communication system 109. When the user of telephone set 103 dials the telephone number associated with agent 116, control module 226 terminates the control portion of this call on agent module 116 utilizing techniques well known to those skilled in the art. Agent 116 then transmits the necessary control messages to control 226 to establish a telephone call to voice messaging system 113. Control 226 performs this operation by interactions with Enterprise communication system 109. After the initial call set up, agent 116 then transmits a message to initiate a call transfer to control 226. Control 226 interacts with Enterprise communication system 109 to accomplish the call transfer. Enterprise communication system 109 in response to messages from control 226 transmits messages to control 226 that causes control 226 to establish a connection between trunk 107 and voice mail system 113 with telephone set 103. The interconnection of voice mail system 113 and telephone set 103 is accomplished by control 226 sending the necessary control messages to controller 212 which controls TDM bus 216. In response to these control signals, a path is set up via TDM bus 216, bus interface 213, TSI 206, MPU bus 204, WAN interface 203 to WAN 106 and then to voice mail system 113 via Enterprise communication system 109. The operation of these components is described in detail in the previously incorporated patent application.

Consider now in greater detail the operation of the user of telephone set 103 placing a call to telephone set 114 connected to Enterprise communication system 109 or to telephone set 112 interconnected to remote switch 108. The call is received by remote switch 102 from central office 101 via trunk circuits 218. Control 226 is responsive to the dialed telephone number of this call to interconnect the call to agent 117. Agent 117 then instructs control 226 to transmit a call set up message to Enterprise communication system 109 via MPU bus 204, WAN interface 203, and WAN 106. In response to this call set up message, Enterprise communication system 109 transmits back a dial tone or in the case of ISDN signaling, the acknowledgment of the call set up message (call proceed message). In response, agent 113 instructs control 226 to interconnect via TDM bus 216 and relay any ISDN messages to trunk circuits 218 for subsequent relaying to central office 101 and telephone set 103. The paths including a talk path and a signaling path is then established from telephone set 103 via central office 101, trunk circuits 218, and TDM bus 216, bus interface 213, TSI 206, MPU bus 204, WAN interface 203, and WAN 106 to Enterprise communication system 109. Enterprise communication system 109 then proceeds with the set up of the call receiving control signals from telephone set 103.

After being started in block 301, decision block 302 determines if there is an incoming call. If the answer is no, block 312 performs normal processing before returning control back to decision block 302. If the answer in decision block 302 is yes, control is transferred decision block 303 which determines if the incoming call is for agent 116. If the answer is yes in decision block 303, block 304 places the incoming call on hold. Block 306 then sets up a call to the voice messaging system. Finally, block 307 transfers the incoming call to the voice messaging system before returning control back to decision block 302.

Returning to decision block 303, if the answer in decision block 303 is no, decision block 308 determines if the call is for agent 117. If the answer is no, block 313 performs normal processing before returning control back to decision block 302. If the answer in decision block 308 is yes, block 309 sets up a call path to the central switch which in the previous example had been Enterprise communication system 109. After the call path has been set up in block 309, block 311 redirects the incoming call to the call path before returning control back to decision block 302.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for controlling telecommunication calls, comprising the steps of:

receiving a telecommunication call via a first call path from a telecommunication unit for a software agent located on a first switching system;

establishing a second call path from the software agent to a second switching system via a switching network in response to the telecommunication call;

interconnecting the received first call path and the second call path upon the second call path being established from the second switching system; and transmitting a call proceed message on the first call path by the second switching system whereby the telecommunication unit is receiving the call proceed message from the second switching system via the first switching system and switching network.

2. The method of claim 1 wherein the step of interconnecting comprises the step of connecting the first call path and second call path together in a network within the first switching system.

3. The method of claim 2 wherein the step of connecting is requested by the software agent.

4. The method of claim 3 wherein the step of establishing comprises the step of requesting the second call path by the software agent.

5. The method of claim 2 wherein the step of connecting comprises the step of requesting an operation of the network by the software agent.

6. A system for continuing telecommunication calls between a remote switching system and a main switching system, comprising:

the remote switching system receiving a telecommunication call via a first call path from a telecommunication unit connected to a central switching system;

the remote switching system terminating the received telecommunication call on a software agent executing in the remote switching system;

the software agent establishing a second call path to the main switching system;

the software agent combining the first call path and the second call path; and the main switching system transmitting a call proceeding message on the first call path whereby the telecommunication unit receives the call proceeding message via the remote switching system and the central switching system.

7. The system of claim 6 further comprises a packet switching network interconnecting the remote switching system and main switching system and the second call path is setup through the packet switching network.

8. The system of claim 6 wherein the call proceeding message is a dial tone.

9. The system of claim 6 wherein the software agent combines the first call path and the second call path by requesting the remote switching system to perform the combining.

10. The system of claim 9 wherein the remote switching system comprises a switching network and the first call path and second call path are interconnected by the switching network.

11. A method controlling telecommunication calls by a software agent, comprising, the steps of:

dialing a first telecommunication call by a telephone set that designates the software agent as a designation endpoint;

receiving the first telecommunication call via a first call path by the software agent;

establishing by the software agent a second call path to a main switching system via a remote switching system upon which the software agent is executing; and requesting by the software agent that the remote switching system combine the first call path and second call path upon receipt of a call proceeding message from the main switching system.

12. The method of claim 11 wherein the first call path is communicated via a central switching system to the remote switching system.

13. The method of claim 11 wherein the call proceeding message is a dial tone.

14. An apparatus for facilitating an interconnection of a unit telephone set connected to a central switching system to a main switching system via a remote switching system with the remote switching system and main switching system being interconnected by a packet switching network, comprising:

means for receiving a telecommunication call on a first call path from the central switching system originated by the telephone set where the means for receiving is designated as a destination endpoint for the first call path by the telephone set;

means for transferring the telecommunication call;

means for terminating the transferred telecommunication call;

means for establishing a second call path to the main switching system via the packet switching network; and means for combining the first call path and the second call path whereby the telephone set is interconnected to the main switching system.

15. The apparatus of claim 14 further comprises means in the main switching system for transmitting a call proceeding message.

16. The apparatus of claim 15 wherein in the call proceeding message is a dial tone.

* * * * *